May 29, 1973   J. S. SMATKO   3,736,185
NON-GASSING BATTERY SEPARATOR AND METHOD OF PRODUCTION
Filed Nov. 27, 1970
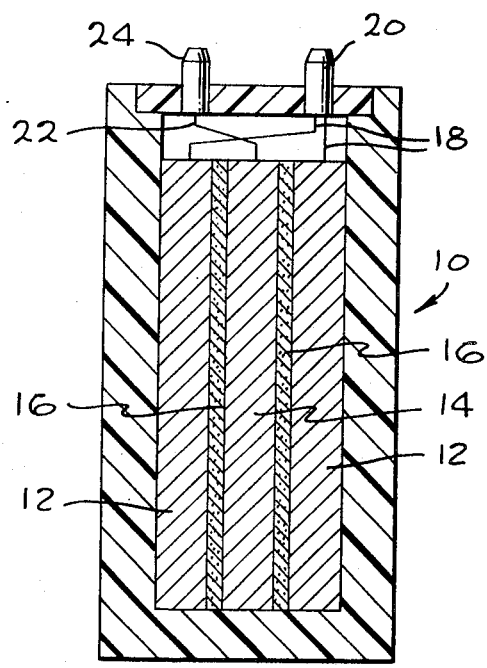
JOSEPH S. SMATKO
INVENTOR.
BY Max Geldin
ATTORNEY

3,736,185
NON-GASSING BATTERY SEPARATOR AND METHOD OF PRODUCTION
Joseph S. Smatko, Santa Barbara, Calif., assignor to McDonnell Douglas Corporation, Santa Monica, Calif.
Filed Nov. 27, 1970, Ser. No. 92,963
Int. Cl. H01m 3/02, 41/00
U.S. Cl. 136—30    23 Claims

ABSTRACT OF THE DISCLOSURE

Production of inorganic porous sintered battery separator essentially eliminating formation of gas when in contact with a zinc electrode, and permitting long cycle life of a high energy density battery such as a silver-zinc battery, produced according to one embodiment by initially firing a mixture of magnesium-bearing material, e.g., MgO, lead-bearing material, e.g., PbO, and silica ($SiO_2$), at temperature in the range of about 1,100 to about 1,550° C., to produce a magnesium silicate-lead silicate composition, granulating and compacting said composition into plaques, and sintering said compacted plaques at temperature ranging from about 800 to about 1,250° C., to produce porous sintered separator members, in the form of a sintered composition or composite of magnesium silcate and lead silicate, having good transverse strength and low resistivity.

---

This invention relates to batteries, particularly high energy density batteries and is especially concerned with the production of improved inorganic members or separators for use in such batteries, especially a high energy density battery containing a zinc electrode, such separators being substantially free from any tendency to cause gassing when in contact with a zinc electrode, thereby permitting production of hermetically sealed batteries of this type having extended life, which can operate as a secondary battery over a large number of charge-discharge cycles efficiently; with novel procedure for producing such separators; and with improved battery constructions embodying such improved separators.

Batteries are an important source of energy storage for power generation. An important type of battery particularly suited for such appliactions are the high energy density alkaline electrolyte cells such as the silver-zinc, zinc-air and nickel-zinc batteries. High energy density batteries are generally battery systems which have a substantially higher energy per unit of weight than conventional, e.g., lead, storage batteries. In addition to important airborne applications, such high energy density batteries have many other applications such as in portable tools and appliances, television, radio and record players, engine starting, portable X-ray units and the like.

In high energy density batteries such as silver-zinc and nickel-zinc batteries, the electrodes are placed adjacent opposite sides of a membrane or separator which performs the function of retaining electrolyte, separating the electrodes, and permitting transfer of electrolyte ions while inhibiting migration of electrode ions. For activation of these batteries, the battery or the components thereof such as the separator are filled with an aqueous alkaline electrolyte in the form of an aqueous solution of an alkali such as potassium hydroxide.

High energy density batteries of the above type, particularly those employing an inorganic separator, are particularly useful as secondary batteries which can be charged and discharged periodically, and can operate at elevated as well as at normal temperatures.

One form of particularly useful inorganic separator for such high energy density batteries, such as silver-zinc batteries is disclosed in Pat. No. 3,446,668. Such inorganic separator is in the form of a sintered porous member composed of magnesium silicate and iron silicate. According to the patent, such separators in addition to being formed from synthetic mixtures of iron-bearing material, magnesium-bearing material, and silica, can be formed from the naturally occurring mineral olivine, a magnesium-iron silicate.

Although the magnesium silicate-iron silicate separator of the above patent has proved successful in high energy density batteries, including silver-zinc batteries when such batteries or cells are vented, it has been found from experience that cells incorporating such separators and containing a zinc electrode, eventually develop gas. Thus, when non-vented or sealed cells such as a sealed silver-zinc battery containing the above noted magnesium silicate-iron silicate separator is cycled, such batteries eventually develop gas, although such cells can be cycled from about 12 to about 80 cycles on shallow cycling regimes without excessive pressure rise. However, thereafter such cells gas significantly during overcharge, and on standing, and in due course of time the pressure rise is sufficiently great to present the danger of rupture of the battery case. Analysis of the gas generated in such batteries shows the major component to be hydrogen.

Tests have been devised to determine the gassing potential of the various cell components. One such test is based on mixing a predetermined weight of test material, such as particulate sintered magnesium silcate-iron silicate separator material produced according to the above patent, with a pre-established amount of zinc powder, compressing the mixture and then exposing the compressed pellet to about 30% KOH solution. The gas produced is collected and measured over a certain time period, the amount of gas collected providing a measure of the degree of activity toward gassing of the above noted separator material in contact with the zinc. This test showed that the magnesium silicate-iron silicate separator material of the above patent is very prone to cause gassing when in contact with zinc.

The above patent also discloses an inorganic separator in the form of a sintered porous member composed of magnesium silicate and zinc silicate. Although such separator is substantially less gassing when employed with a zinc electrode in a battery, as compared to the above noted magnesium silicate-iron silicate separator of such patent, such magnesium silicate-zinc silicate separator when employed in a high energy density battery containing alkali electrolyte, has substantially shorter cycle life as compared to the magnesium silicate-iron silicate separator of the patent, because of the large amount of zinc generally present in such separators, and after a period of cycling same, a significant amount of zinc dissolves in the alkali, weakening the separator and causing deterioration thereof.

Further, neither the magnesium silicate-iron silicate nor the magnesium silicate-zinc silicate separators of the above patent can be efficiently cycled over extended periods at deep discharge, that is cycling at 50 to 100% depth of discharge.

In accordance with the present invention, it has been found that porous members or membranes comprising a sintered composition of magnesium silicate and lead silicate, provide separators which not only are non-gassing when employed with a zinc electrode, but actually even inhibit the normally slight gassing tendency of zinc itself, as will be pointed out more clearly hereinafter. In addition, such separators have good alkali resistance and provide highly extended battery cycle life. Of particular significance, the magnesium silicate-lead silicate separators of the invention are capable when incorporated in a high energy density battery such as a silver-zinc battery of deep cycling, of from 50 to 100% depth of discharge without shorting and without gassing in the presence of the zinc electrode. Further, such separators have desirable porosity properties, low resistivity, and zinc dendrite inhibiting properties in the presence of zinc. Also such separators have high strength or modulus of rupture.

Briefly, the process of the present invention for producing a non-gassing separator when employed with a zinc electrode, and having high resistance to alkali and high strength, is produced by a process which comprises sintering a compacted composition of magnesium silicate and lead silicate at temperature ranging from about 800 to about 1,250° C.

In general practice for carrying out the invention for obtaining the improved non-gassing separators hereof, a mixture of suitable magnesium-bearing, lead-bearing, and $SiO_2$-bearing materials is formed, generally in proportions by weight of the mixture, of about 28 to about 60%, preferably about 36 to about 56%, magnesium or magnesium-bearing material or compound calculated as MgO, about 0.5 to about 40%, preferably 2 to about 30%, lead or lead-bearing material or compound calculated as PbO, and about 25 to about 50%, preferably about 34 to about 45%, of $SiO_2$-bearing material, calculated as silica ($SiO_2$). It will be understood that the proportions of components employed can be varied to obtain the desired separator structure in terms of strength, porosity and chemical composition.

Suitable magnesium-bearing materials or magnesium compounds which can be employed are, for example, magnesium carbonate, magnesium sulfate, magnesium nitrate, magnesium chloride, magnesium silicate, magnesium oxide and hydroxide, and the naturally occurring minerals talc, Enstatite, Magnesite and Forsterite.

As source for the lead, or lead-bearing material or compound, there can be employed lead acetate, lead dioxide, white lead, red lead, litharge, lead hydroxide, tribasic lead silicate, lead sulfate, lead powder, basic lead acetate (also known as lead subacetate) and lead nitrate. Even lead sulfide (galena) may be used during the initial or oxiding firing. Natural minerals such as Cerrusite ($PbCO_3$), Anglesite ($PbSO_4$), and the like, also can be used, if desired.

As a source of suitable $SiO_2$-bearing material, there can be employed for example, flint, silica, sand, diatomaceous earth or magnesium silicate, silica gel, silicic acid, fume silica, and the like.

In preferred practice for producing the non-gassing separator when in contact with zinc according to the invention, the content of impurities in the form of metals such as iron, nickel and cobalt in the above noted source materials should be low since such metals when present in the final separator produce low hydrogen overvoltages when in contact with zinc. Thus, it is preferred that the source materials be substantially free of iron, nickel and cobalt, and contain very little, if any, of such metals, preferably not in excess of about 1% calculated as FeO, total of such metals by weight of the total inorganics content of the starting mixture. However, in certain instances larger amounts of such metals can be tolerated, but are not preferred.

The starting mixture of magnesium-bearing and lead-bearing materials, e.g., in the form of their oxides, and silica-bearing material, such as silica, can be produced, by mixing and ball-milling the requisite amount or proportions of these materials as noted above, until the mixture preferably is reduced to relatively small particle size, e.g., 5 microns or less, which is most desirable for rapid reaction of the components. Larger particle size of the mixture of components can be employed, but under these conditions, higher firing temperatures and/or longer reaction times are generally required.

To the above mixture of starting materials, preferably of fine particle size, there can be added a small amount, e.g., about 0.1 to about 15%, preferably about 2 to about 10%, of an organic binder, by weight of total inorganics, such as a polyethylene glycol, e.g., Carbowax, beeswax, paraffin wax or whale wax, generally dissolved in a suitable solvent such as acetone or toluene, and the resulting mixture dried, e.g., at ambient temperature or at elevated temperature to remove solvent. Although the addition of an organic binder is not necessary, it is preferred to employ such binder in order to provide adequate "green strength" for handling the mixture.

The resulting mass is then pressed into blocks at pressures of about 2,000 to about 40,000 p.s.i., the presence of the binder aiding in this operation. Where a binder is present, such blocks are then fired first in air at temperature of the order of about 400 to about 600° C. for a period of about 15 minutes to about 4 hours, to remove the organic binder. The blocks are then fired at temperature of the order of about 1,000° C. to about 1,550° C., usually about 1,150° C. to about 1,500° C. The latter firing operation is generally carried out for a period of about 1 to about 20 hours, usually about 1 to about 8 hours.

In order to avoid or minimize lead loss during the above firing operation, the mixture of components preferably, although not necessarily, is fired in crucibles covered with a well-fitting cover. This assembly is then placed in a larger crucible, also containing a portion of the same charge or mixture in the annulus between the crucibles, and also fitted with a cover. The material in the annulus provides a balancing of the lead vapor pressure to minimize loss from the inner crucible. Alternatively, one may fire in a single crucible with cover, but in this case the mixture contains excess lead, sufficient to accommodate volatilization losses during firing.

Such initial firing operation causes reaction between the various components of the mixture, that is between the magnesium-bearing, lead-bearing, and silica materials, to convert the mixture into a magnesium silicate-lead silicate composition. Thus, during such initial firing operation the various components are converted to the oxides and then by reaction forming with the silica component, magnesium-lead silicate of the following general formula:

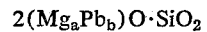

$$2(Mg_aPb_b)O \cdot SiO_2$$

The values for the $a$ and $b$ subscripts of the above formula vary depending on the relative proportions of the magnesium-bearing material, lead-bearing material, and silica-bearing material employed.

An alternative modification makes use of the magnesium-containing and silica-containing components of the starting mixture, without the lead-bearing material, and such mixture is first reacted at high temperature of about 1,300 to about 1,550° C., e.g., from about 1 to 8 hours, the fired mixture reground to fine particle size, the lead-bearing material or compound then added, and the resulting mixture refired at lower temperature, e.g., 1,000 to 1,250° C. for 1 to 8 hours, thereby minimizing lead loss.

Various other modifications of the procedures noted above can be followed without departing from the spirit of this invention. For example, the lead can be introduced as a soluble salt, as for example, lead nitrate, into a heavy water slurry of the other mixed components, e.g., as their oxides. Sufficient ammonia can then be added to precipitate all of the lead, even though a portion of such lead is precipitated by the residual alkalinity of the magnesia. The slurry can be dried, and processed as described above into blocks and fired, since the residual ammonium nitrate will be eliminated in the initial firing operation.

Likewise, either or both the zinc oxide and/or the magnesium oxide can be replaced by soluble salts such as the nitrates. An advantage of the above noted precipitation procedure is the excellent intimacy of the resulting mixture as well as the resulting very fine particle size of the components, permitting reaction to be completed in reduced time periods and/or lower temperatures. The precipitant can be ammonium carbonate or ammonium hydroxide, in which cases it is not necessary to filter out the residual salts prior to firing. However, precipitation can be carried out employing sodium hydroxide or sodium carbonate, with subsequent filtration and washing to remove residual sodium salts.

Following any of the procedures noted above, the resulting initially fired pressed blocks, following cooling thereof, are granulated or pulverized, and ground to fine particle size, e.g., below about 5 microns, preferably although not necessarily, again mixed with fugitive organic binders of the types noted above and in the above noted amounts, and the mixture granulated, e.g., by pressing granulation, as through a screen, and the resulting powder is then pressed into blocks or plaques at pressures, e.g., ranging from about 2,000 to about 40,000 p.s.i., preferably about 5,000 to about 20,000 p.s.i., and, when employing such binders, are fired first at temperature of the order of about 40 to about 600° C. for a period of about 15 minutes to about 4 hours, to remove the organic binder. The pressed plaques are then sintered at temperatures of the order of about 800 to about 1,250° C., for a period of from about 5 minutes to about 8 hours, to form the magnesium silicate-lead silicate composition into the desired structure, that is in the form of porous members or membranes having the required characteristics of porosity, strength, alkali resistance and resistivity, as noted above, for use as battery separators. At low lead content of the separator compositions within the ranges noted above, sintering temperatures in the upper portion of the above 800 to 1,250° C. range, e.g., about 1,000 to about 1,250° C., are preferably employed, and for high lead content, sintering temperatures in the lower portion of such range, e.g., about 800 to about 1,000° C., preferably are employed.

The resulting porous sintered separators are believed to be in the form of a composite of magnesium silicate and lead silicate. Such separators have a composition ranging from about 65 to about 99.5 mol percent, preferably about 75 to about 99 mol percent magnesium silicate, and about 0.5 to about 35, preferably about 1 to about 25, mol percent lead silicate.

As will be pointed out more fully below, it has been found that the resulting separators not only possess the ability to eliminate gassing when associated or in contact with a zinc electrode in a battery, but also inhibit the slight tendency toward gassing of the zinc electrode itself, thereby permitting hermetic sealing of the battery and affording very long cycle life. In addition, such separators have low resistivity which can range from about 5 to about 50 ohm.-cm., providing high electrical efficiency, relatively high transverse strength or modulus of rupture ranging from about 8,000 to about 19,000 p.s.i., a porosity corresponding to a water absorption ranging from about 5 to about 50%, preferably about 7 to about 25%, and having good resistance to alkali. In addition to eliminating gassing when in contact with a zinc electrode, the separators of the invention inhibit formation of zinc dendrites when in contact with a zinc electrode in a battery, thereby further aiding in prolonging battery life. The separators produced according to the invention can have a thickness ranging from about .005 to about 0.050 inch, but it will be understood that separators according to the invention, of any desired thickness can be produced.

Separators produced according to the invention are especially useful in cells that are cycled frequently on short time regimes, and/or large depths of discharge, i.e., 50% to 100%. They are also especially useful where significant overcharge is applied, deliberately or inadvertently, as for example in nickel-zinc cells, where overcharge is necessary to be assured of a fully charged nickel electrode. The dendrite inhibiting characteristic of this separator, coupled with the inhibition of gassing of the zinc electrode, provide a marked advantage in that it permits long cycle life, and improved cell efficiency. These separators also advantageously strongly inhibit slumping of the zinc electrode during cycling, such slumping being defined as redistribution and accumulation of the zinc on the lower mid-portion of the electrode on cycling, resulting in capacity loss, cell bulging, separator tearing or fracture. All the above factors promote cell longevity and good performance during active life.

The magnesium silicate-lead silicate separator material produced according to the invention and converted or granulated to a ground particulate form, can be employed as inorganic separator material used in flexible separators, generally comprised of such separator material in particulate form distributed uniformly in a polymeric organic binder.

These include, for example, the flexible separators described in the copending application, Ser. No. 676,224, filed Oct. 18, 1967 of C. Berger et al., now abandoned, and consisting, for example, of a porous inorganic material, which can be the above noted improved separator material of the present invention in particulate form, and a minor portion of a water coagulable organic fluorocarbon polymer such as a vinylidene fluoride polymer, to bond the particles of the inorganic material.

Also, the above noted inorganic separator material produced according to the invention in particulate form can be employed as the inorganic material in the flexible separators described in the copending application, Ser. No. 676,223, filed Oct. 18, 1967, of F. C. Arrance, now Patent No. 3,542,596, and consisting for example of a major portion of such inorganic material, e.g., the above noted magnesium silicate-lead silicate separator material of the invention, a minor portion of potassium titanate, and a minor portion of an organic polymer such as polyphenylene oxide as bonding agent.

Further, the improved inorganic separator material of the present invention in particulate form can be applied in the copending application, Ser. No. 707,808, filed Feb. 23, 1968, of F. C. Arrance et al., now abandoned in favor of continuation application Ser. No. 154,218, filed June 17, 1971, disclosing an improved flexible porous separator, which can be box-shaped to provide a compartment for a battery electrode, produced by applying on a flexible porous substrate, such as flexible sheets or mats of various materials including potassium titanate paper, asbestos, alumino-silicate sheets, and the like, a film comprising a mixture of particulate separator material according to the invention, i.e., magnesium silicate-lead silicate, and an organic polymeric bonding agent of various types, such as polyphenylene oxide, or a fluorocarbon polymer such as vinylidene fluoride polymer, bonding the particles of the inorganic material together with the bonding agent, and forming a porous substantially inorganic separator film on the flexible substrate.

Also, the improved separator material of the invention, in particulate form, can be employed as the inorganic material in producing the flexible microporous separator film described in copending application, Ser. No. 27,577, filed Apr. 13, 1970, by M. P. Strier and J. S. Smatko, which consists essentially of an organic polymer such as polytetrafluoroethylene, having particles of such inorganic material uniformly distributed in said film.

In addition, the inorganic separator material of the invention, in particulate form, can be employed for producing a flexible porous separator according to the principles of copending application, Ser. No. 829,573, filed June 2, 1969, of F. C. Arrance, now Patent No. 3,625,770, by applying a mixture of such material and an organic polymeric bonding agent such as polyphenylene oxide to a flexible fuel cell asbestos matrix, previously impregnated with polyphenylene oxide.

The following are examples illustrating practice of the invention:

EXAMPLE 1

The following mixture of the components is prepared:

| | Wt. percent | Wt./grams |
|---|---|---|
| $SiO_2$ (high purity sand) | 33.7 | 60 |
| MgO | 41 | 73 |
| PbO | 25.3 | 45 |
| Total | 100.0 | 178 |

The components are first dry blended to form an intimate mixture, followed by moistening to a paste with sufficient toluene, containing 9 grams of paraffin wax (about 5% by weight of inorganics). The paste is gradually dried while being stirred, to form a mass of small crumbs, which is pressed into blocks in a die, at 20,000 p.s.i. The blocks are fired in a crucible with a snug cover, the assembly being nested within a larger covered crucible, containing within the annulus, a mass of material approximating the above composition. The firing temperature is 1,350° C. for 3 hours.

The cooled porcelain-like mass is crushed to about 16 mesh, followed by ball-milling in acetone for 50 hours. The fine mass is filtered, and the damp cake is made into a slurry with 50 cc. of warm acetone containing 9 grams of Carbowax-4000, followed by drying. The resulting crumbs are granulated by pressing through screens to yield a pressing powder fraction between 60 mesh and 150 mesh. The powder is pressed into plaques, at 8,000 p.s.i., fired at 400° C. for ½ hour to remove volatiles, and then fired at 850° C. for 15 minutes, yielding separators about 27 mils thick, a porosity corresponding to a water absorption averaging about 11%, an average apparent density of about 2.44 g./cc., a modulus of rupture of about 13,900 p.s.i., and a resistivity in 30% KOH of about 14 ohm-cm.

Another group of the same composition, but pressed at 16,000 p.s.i., and fired together with the above noted group, yields separators with a porosity corresponding to a water absorption of about 9.4%, an average apparent density of 2.52 g./cc., a modulus of rupture of about 15,200 p.s.i., and a resistivity in 30% KOH of about 18 ohm-cm.

The separators contain about 90 mol percent magnesium silicate and about 10 mol percent lead silicate.

EXAMPLE 2

The following mixture of components is prepared:

| Components | Wt. percent | Wt./grams |
|---|---|---|
| Colloidal $SiO_2$ (Cab-O-Sil) | 25.4 | 66.1 |
| $MgCO_3$ | 64.6 | 168.6 |
| $2PbCO_3 \cdot Pb(OH)_2$ | 10.0 | 25.9 |
| Total | 100.0 | 260.6 |

The powdered raw materials are dry blended for ½ hour, then made into a heavy slurry with sufficient water, carrying about 5 grams of "Elvanol–51–05" (polyvinyl alcohol marketed by Du Pont). The mass is dried out on a hot plate while being stirred, yielding a mass of small crumbs, which is pressed at 30,000 p.s.i. into blocks. The blocks are fired in the crucible arrangement described in Example 1, at a temperature of 1,300° C. for 3½ hours. The cooled mass is crushed to about 16 mesh size and then subsequently ball-milled for 60 hours in hexane.

The ground mass is filtered, yielding a damp cake, which is made into a paste with about 60 cc. of warm hexane containing 11 grams of a fugitive binder, about 6% of the total weight of inorganics, comprised of equal parts beeswax, paraffin wax, stearic acid and camphor. The paste is dried in a current of air while being stirred, to yield a mass of crumbs that is shaken on a set of sieves to yield a granulated fraction between 60 mesh and 150 mesh, suitable for pressing into plaques. Plaques are pressed from the above granulated mass both at 8,000 p.s.i. (group A) and at 16,000 p.s.i. (group B), and are all fired at 800° C. for 65 minutes, after prefiring at 400° C. for 20 minutes to remove the binder. The average porosity values for the A group corresponds to 13% water absorption, apparent density of 2.33 grams per cc., resistivity in 30% KOH of 12 ohm-cm., and modulus of rupture of 11,300 p.s.i. Average porosity for the B group corresponds to a water absorption of 12%, apparent density of 2.39 g./cc., a resistivity of 14 ohm-cm., and modulus of rupture of 12,300 p.s.i.

The resulting plaques or separators contain about 91 mol percent magnesium silicate and about 9 mol percent lead silicate.

EXAMPLE 3

The following mixture of components is prepared:

| Components | Wt. percent | Wt./grams |
|---|---|---|
| Forsterite (magnesium silicate) | 82 | 270 |
| $Pb(NO_3)_2$ | 16.1 | 53 |
| Cab-O-Sil | 1.9 | 6 |
| Total | 100.0 | 329 |

The forsterite is ground in a ball mill for 60 hours in acetone, then the Cab-Sil is added to the mill, and the mixture milled for ½ hour more. The ground mass is filtered, yielding a damp cake which is made into a thin slurry with about 400 cc. of water. To this slurry is added the lead nitrate dissolved in a minimum to warm water, while stirring vigorously. Then 40 grams of ammonium carbonate monohydrate in 100 cc. warm water is slowly added with stirring. After ½ hour of stirring, the mass is filtered, and the filter cake is de-watered by displacing the water with acetone. The damp cake is crumbled and laid out on a sheet of plastic to air dry for 10 minutes.

The crumbs are compressed at 33,000 p.s.i. into blocks, and fired in a closed crucible for 6 hours at 1,280° C. The hard mass is crushed to about 16 mesh size and again ball-milled for 60 hours in hexane, followed by filtration to yield a damp cake, which is made into a paste with about 12 grams of paraffin (about 4% of the inorganic solids) dissolved in 100 cc. warm toluene. The paste is dried in a current of air while being stirred, to yield a mass of crumbs. The crumbs are sifted through a set of screens and the fraction between 60 mesh and 150 mesh is used as a pressing powder for the plaques.

Plaques are pressed at 9,000 p.s.i., and fired for 15 minutes at 450° C., followed by firing at 1,085° C. for 18 minutes, to yield separators having average properties as follows: Porosity corresponding to a water absorption of 10.3%, apparent density—2.45 g./cc., modulus of rupture—14,100 p.s.i., and resistivity—16 ohm-cm.

The resulting separator plaques contain about 96 mol percent magnesium silicate and about 4 mol percent lead silicate.

EXAMPLE 4

| Components | Wt. percent | Wt./grams |
|---|---|---|
| Magnesium trisilicate | 28.2 | 136 |
| $Mg(NO_3)_2 \cdot 6H_2O$ | 70.4 | 340 |
| $Pb(NO_3)_2$ | 1.4 | 7 |
| Total | 100.0 | 483 |

The magnesium trisilicate is made into a slurry with water, and then poured into a hot solution comprising magnesium nitrate and lead nitrate dissolved in 700 cc. of water. Under vigorous stirring, 280 cc. of (28%) ammonium hydroxide dissolved in 300 cc. of cold water is slowly added to the nitrate-containing solution, to precipitate the magnesium and lead hydroxides. Stirring is continued for one hour, and the suspension is filtered. The filter cake is dewatered by displacement of the water with acetone. The damp cake is crumbled and dried for 10 minutes.

The crumbs are compressed into blocks at 35,000 p.s.i. and fired in the double crucible arrangement described in Example 1, for 6 hours at 1,420° C. The cooled blocks are crushed to 16 mesh size and ball milled in heptane for 50 hours, followed by filtration. The damp cake is made into a slurry with 80 cc. warm toluene containing about 8 grams of Carbowax–4000 (about 6% of the total inorganics weight), followed by drying while being stirred, to form crumbs which are pressed through sieves to yield a pressing powder between 60 and 150 mesh.

The powder is pressed into plaques and fired, first at 450° C. for 15 minutes and then at 1,200° C. for 16 minutes to yield plaques having the following properties: Porosity corresponding to a water absorption of 11.3%, apparent density—2.36 g./cc., modulus of rupture—12,800 p.s.i., and resistivity—14 ohm-cm.

The resulting separator plaques contain about 98 mol percent magnesium silicate and about 2 mol percent lead silicate.

EXAMPLE 5

Balsam Gap natural olivine having the composition 47–49%, MgO, 7–9% FeO and 30–41% $SiO_2$, processed into magnesium silicate-iron silicate separator material according to the procedure described in the above patent 3,446,-668, by firing the Balsam Gap olivine at temperature of about 1,300° C. is provided, and designated material (A). There is also provided magnesium silicate-zinc silicate separator material produced according to Example 1 of the above patent and containing just under 40 mol percent magnesium silicate and just over 60 mol percent zinc silicate, such mixture designated (B).

There is also provided the magnesium silicate-lead silicate separator material of Example 2 above, containing about 91 mol percent magnesium silicate and about 9 mol percent lead silicate, in granulated form, and designated material (C).

The above noted mixtures of materials (A), (B) and (C) are each respectively mixed with 68.4% zinc powder by weight of the mixture, and the respective mixtures compressed at about 18,000 p.s.i. into pellets, and such pellets contacted under the same conditions with 30% KOH solution at ambient temperature. Further, a zinc blank is pelleted in the same manner and contacted with the same concentration KOH solution. The gas produced in each test is collected and measured with respect to time.

The materials tested and the amount of gas collected at various specified times from the reaction of the respective pellets contacted with the KOH solution, are set forth in the table below:

separator material of the invention (C) at the end of 48 hours is only 1.1 cc., as compared to the 5.1 cc. for the magnesium silicate-zinc silicate separator material (B) of the patent.

Of particular significance, it is seen that the separators of the present invention as represented by material (C) of the above table, not only eliminate gassing when in contact with zinc, but actually inhibit the normally slight gassing tendency of zinc itself, as noted by a comparison of the gassing rates for material (C) in Test (3), with the gassing rates for the zinc blank (Test 4) at the end of 6 hours, 24 hours and 48 hours. It is noted that these values for the zinc blank are 0.3, 1.5 and 3.0 cc., respectively, which are substantially higher than the corresponding values at the end of 6 hours, 24 hours and 48 hours, for material (C) in Test (3).

EXAMPLE 6

The sintered separator plaques of Example 4 are ground, ball milled and dried. 80 parts by weight of such separator material are mixed into a solution containing, by weight, 10 parts polyphenylene oxide, 10 parts polypropylene polyazelate, marketed as Plastolein 9750 by Emery Industries, Inc., dissolved in approximately 93 parts chloroform. This mixture is ball-milled 16 hours to form a smooth product of paint-like consistency. It is coated on 10 mil-thick fuel-cell asbestos sheets, previously dipped in a 2% polyphenylene oxide polymer solution in chloroform and dried. The liquid coating is adjusted to form a dried film about 5 mils thick. The sheets so prepared after drying are flexible separators suitable for use particularly in high energy density silver-zinc batteries subjected to deep discharge cycling and having the non-gassing characteristics in the presence of zinc and alkali, of the magnesium silacte-lead silicate separators of the invention.

EXAMPLE 7

The sintered magnesium silicate-lead silicate separator plaques produced in Example 1 are ground and ball milled to fine particle size.

The material is then processed according to Example 1 of above copending application, Ser. No. 27,577, to produce a substantially non-gassing separator in the following manner. An amount of 335 grams of such fine particle size magnesium silicate-lead silicate is suspended in 225 grams water to form a 60% suspension by weight. An amount of 237.4 grams of Du Pont T–30B TFE aqueous emulsion of polytetrafluoroethylene (60.4% solids

TABLE

| Test No. | Starting material | Gas collected (cc.) | | | | |
|---|---|---|---|---|---|---|
| | | 1 hr. | 2 hrs. | 6 hrs. | 24 hrs. | 48 hrs. |
| 1 | Balsam Gap olivine (A)—Pat. No. 3,446,668 | 66 | 108 | 220 | 431 | 55.9 |
| 2 | Magnesium silicate-zinc silicate (B)—Pat. No. 3,446,668 | 0.2 | 0.7 | 1.0 | 2.2 | 5.1 |
| 3 | Magnesium silicate-lead silicate (C) | 0.0 | 0.0 | 0.1 | 0.6 | 1.1 |
| 4 | Zinc blank | 0.0 | 0.0 | 0.3 | 1.5 | 3.0 |

Results from the above table show greatly reduced gassing rates corresponding to essentially complete elimination of gassing for the magnesium silicate-lead silicate material (C) of the present invention (Test 3), as compared to the Balsam Gap Olivine separator material (A) produced according to the above patent (Test 1), and superior non-gassing effectiveness over the magnesium silicate-zinc silicate separator material of the above patent (Test 2), in the presence of the zinc in alkali. Thus, it is noted that the gassing rates for the magnesium silicate-lead silicate material (C), according to the present invention (Test 3), at the end of 6 hours, 24 hours and 48 hours is only 0.1, 0.6 and 1.1 cc., as compared, for example, to 220, 431 and 559 cc., respectively (Test 1), for the olivine (magnesium silicate-iron silicate) material (A) produced according to the above patent. Note also the amount for the magnesium silicate-lead silicate content) is added slowly to the magnesium silicate-lead silicate dispersion.

After about 20 to 30 minutes of stirring, the resulting homogeneous slurry or aqueous dispersion is poured on a Pyrex glass plate, and is drawn down by means of a doctor blade set at 0.038 cm. (15 mils). The resulting film is dried initially for about 15 minutes in the draft of a laboratory hood at about 70° F., and further dried at ambient room temperature for 15 hours. The dried film is then sintered at 360° C. for 20 minutes. About 12 grams of glycerine is added to the slurry prior to casting, per 100 ml. of such mixture, to improve film properties and prevent cracking during the following sintering operation.

The resulting sintered film formed of about 70% magnesium silicate-lead silicate and about 30% polytetrafluoroethylene, is highly flexible, has uniform distribution of the inorganic particles, has good stability in aqueous KOH solution at 50 to 100° C., and is capable when employed in a silver-zinc battery of permitting deep discharge cycling over extended periods without shorting and without gassing.

EXAMPLE 8

Referring to the accompanying illustrative drawing, the separators produced according to Example 3 are assembled in a three electrode battery of the type indicated at 10, each consisting of two silver electrodes 12 and one zinc electrode 14, with the zinc electrode sandwiched between two of the magnesium silicate-lead silicate separators 16 produced according to Example 3 above, one separator opposite each face of the zinc electrode, such separators contacting the adjacent silver electrodes. The two silver electrodes are connected via leads 18 to a battery terminal 20, and the zinc electrode is connected via a lead 22 to the battery terminal 24. The battery is filled with 30% KOH.

Three separate batteries having the above described construction are provided, and are tested using a cycling regime of ½ hour discharge and 2 hours charge per cycle. Discharge of the cells is to 75% depth of discharge.

Using the above noted cycling regime, one of the above described batteries employing the magnesium silicate-lead silicate separators of Example 3, operates for 2,741 cycles, a second of such batteries for 2,913 cycles, and the third for 3,305 cycles, with substantially no gassing in any of these batteries.

The cell acquiring 2,913 cycles is removed from test and cut apart to observe the condition of the separators and electrodes. The zinc electrode appears to have slumped very little if at all. The separators are intact, white-looking, and with no evidence of zince dendrite penetration. One separator is washed, dried, cut into a test size piece, and tested for modulus of rupture. Its value is 11,600 p.s.i.

The above tests clearly illustrate the remarkable characteristics of the magnesium silicate-lead silicate separators of the invention to permit deep discharge cycling over a very large number of charge-discharge cycles of a zinc electrode-containing high energy density battery, without shorting, without gassing, and in the absence of zinc dendrite formation, while at the same time maintaining its strength and preventing slumping of the zinc electrode.

Although the improved magnesium silicate-lead silicate separators produced according to the invention are particularly advantageous when employed with a zinc electrode to essentially eliminate gassing tendency and obtain the additional advantages pointed out above, it will be noted that the improved separators of the present invention can also be utilized in high energy density batteries containing electrodes other than zinc electrodes, for example, in a nickel-cadmium or silver-cadmium battery, with advantageous results in providing reduction of dendrite growth on prolonged cycling.

In view of the foregoing, it is seen that the invention provides non-gassing efficient separators, particularly when employed with a zinc electrode, permitting the provision of hermetically sealed long lived secondary batteries, such as efficient sealed silver-zinc and nickel-zinc batteries, which are capable of prolonged deep discharge cycling. In addition, the magnesium silicate-lead silicate separators of the invention have high transverse strength, low resistivity, inhibiting effect on zinc dendrite formation, high alkali resistance and prevent zinc electrode slumping.

While I have described particular embodiments of the invention for purposes of illustration, it will be understood that various changes and modifications can be made therein within the spirit of the invention, and the invention accordingly is not to be taken as limited except by the scope of the appended claims.

I claim:

1. A non-gassing battery separator when employed with a zinc electrode, and having high strength and good resistance to alkali, in the form of a porous member having a sintered composition consisting essentially of about 65 to about 99.5 mol percent magnesium silicate and about 0.5 to about 35 mol percent lead silicate, said separator having a porosity corresponding to a water absorption ranging from about 5% to about 50%.

2. A battery separator as defined in claim 1, said composition consisting essentially of about 75 to about 99 mol percent magnesium silicate and about 1 to about 25 mol percent lead silicate.

3. A battery separator as defined in claim 2, said separator having a modulus of rupture ranging from about 8,000 to about 19,000 p.s.i. and a resistivity ranging from about 5 to about 50 ohm-cm.

4. A flexible battery separator as defined in claim 1, said sintered composition in particulate form being distributed uniformly in a polymeric organic binder.

5. A flexible battery separator as defined in claim 2, said sintered composition in particulate form being distributed uniformly in a polymeric organic binder.

6. A flexible battery separator as defined in claim 2, said sintered composition in particulate form being distributed uniformly in a polymeric binder selected from the group consisting of polyphenylene oxide and polytetrafluoroethylene.

7. In a battery containing a zinc electrode, a non-gassing battery separator having high strength and good resistance to alkali, in the form of a porous member having a sintered composition consisting essentially of about 65 to about 99.5 mol percent magnesium silicate and about 0.5 to about 35 mol percent lead silicate, said separator having a porosity corresponding to a water absorption ranging from about 5% to about 50%.

8. In a battery as defined in claim 7, said composition of said separator being a composite consisting essentially of about 75 to about 99 mol percent magnesium silicate and about 1 to about 25 mol percent lead silicate.

9. In a battery as defined in claim 7, said zinc electrode being positioned on one side of said separator and including a silver electrode positioned on the opposite side of said separator.

10. In a battery as defined in claim 7, said zinc electrode being positioned on one side of said separator and including a nickel electrode positioned on the opposite side of said separator.

11. A process for producing a non-gassing separator when employed with a zinc electrode, which comprises sintering a compacted magnesium silicate-lead silicate composition at temperature ranging from about 800 to about 1,250° C., wherein said magnesium silicate-lead silicate composition contains about 28 to about 60% magnesium calculated as MgO, about 0.5 to about 40% lead calculated as PbO, and about 25 to about 50% silica ($SiO_2$), by weight.

12. The process as defined in claim 11, wherein said magnesium-bearing material is MgO and said lead-bearing material is PbO.

13. A process for producing a non-gassing separator when employed with a zinc electrode, and having high strength and good resistance to alkali, which comprises compacting a mixture of about 28 to about 60% magnesium-bearing material calculated as MgO, about 0.5 to about 40% of a lead-bearing material calculated as PbO, and about 25 to about 50% silica, by weight, initially firing said compacted mixture at a temperature in the range of about 1,000 to about 1,550° C., granulating the resulting fired composition, compacting said granulated composition, and sintering said last mentioned compacted composition at temperature ranging from about 800 to about 1,250° C., to produce said separator.

14. The process as defined in claim 13, wherein said initial firing is carried out at temperature ranging from about 1,150 to about 1,500° C.

15. The process as defined in claim 13, including incorporating an organic binder in said mixture prior to said sintering.

16. The process as defined in claim 13, including adding about 0.1 to about 15% of an organic binder by weight of total inorganics to said mixture and compacting said mixture prior to said initial firing at about 1,000 to about 1,550° C., and including incorporating about 0.1 to about 15% of an organic binder in said compacted magnesium silicate-lead silicate composition by weight of total inorganics, prior to said subsequent sintering from about 800 to about 1,250° C.

17. The process as defined in claim 16, including pressing said mixture into blocks prior to said initial firing, granulating said blocks following said initial firing, incorporating said organic binder in the resulting granular mixture of magnesium silicate-lead silicate composition, and pressing said last mentioned mixture into plaques, followed by said sintering said plaques at a temperature ranging from about 800 to about 1,250° C.

18. The process as defined in claim 17, wherein said initial firing is carried out at temperatures ranging from about 1,150 to about 1,500° C. for a period of about 1 to about 8 hours, and said subsequent sintering is carried out at temperatures ranging from about 800 to about 1,000° C. for a period of from about 5 minutes to about 8 hours.

19. The process as defined in claim 18, said starting mixture consisting essentially of about 36 to about 56% magnesium-bearing material calculated as MgO, about 2 to about 30% of a lead-bearing material calculated as PbO, and about 34 to about 45% silica, by weight.

20. The process as defined in claim 13, said magnesium-bearing material being a member of the group consisting of magnesium carbonate, magnesium sulfate, magnesium nitrate, magnesium chloride, magnesium silicate, magnesium oxide and hydroxide, and the naturally occurring minerals talc, Enstatite, Magnesite and Forsterite.

21. The process as defined in claim 20, said lead-bearing material being a member of the group consisting of lead acetate, lead dioxide, white lead, red lead, litharge, lead hydroxide, tribasic lead silicate, lead sulfate, lead powder, basic lead acetate, lead nitrate, lead sulfide, and the minerals Cerrusite and Anglesite.

22. The process as defined in claim 21, said silica being derived from a member of the group consisting of flint, silica, sand, magnesium silicate, silica gel, silicic acid, and fume silica.

23. The process as defined in claim 22, including adding about 0.1 to about 15% of an organic binder by weight of total inorganics to said mixture, said organic binder being a member of the group consisting of polyethylene glycol, beeswax, paraffin wax and whale wax, and compacting said mixture prior to said initial firing at about 1,000 to about 1,550° C., and including incorporating about 0.1 to about 15% of said organic binder in said compacted magnesium silicate-lead silicate composition by weight of total inorganics, prior to said subsequent sintering from about 800 to about 1,250° C.

References Cited

UNITED STATES PATENTS

| 2,148,621 | 2/1939 | Hood | 106—53 |
| 3,519,446 | 7/1970 | Earl | 106—39 R |

ALLEN B. CURTIS, Primary Examiner

H. A. FEELEY, Assistant Examiner

U.S. Cl. X.R.

136—146, 148